United States Patent
Culpepper et al.

(10) Patent No.: US 7,151,446 B2
(45) Date of Patent: *Dec. 19, 2006

(54) SYSTEM FOR TRACKING AND LOCATING AN OBJECT USING A CELLULAR NETWORK

(75) Inventors: Jerry W. Culpepper, Garland, TX (US); Lawrence M. Smith, Lewisville, TX (US); James P. VanCleave, The Colony, TX (US)

(73) Assignee: Spectrum Tracking Systems, Inc., Carrollton, TX (US)

( * ) Notice: Subject to any disclaimer, the term of this patent is extended or adjusted under 35 U.S.C. 154(b) by 218 days.

This patent is subject to a terminal disclaimer.

(21) Appl. No.: 10/710,487

(22) Filed: Jul. 14, 2004

(65) Prior Publication Data

US 2005/0024202 A1 Feb. 3, 2005

Related U.S. Application Data

(60) Provisional application No. 60/491,951, filed on Aug. 1, 2003, provisional application No. 60/491,952, filed on Aug. 1, 2003.

(51) Int. Cl.
H04Q 7/00 (2006.01)
(52) U.S. Cl. .......................... 340/539.21; 340/539.32; 455/422.1; 455/461
(58) Field of Classification Search ............. 340/572.1
See application file for complete search history.

(56) References Cited

U.S. PATENT DOCUMENTS

| | | | |
|---|---|---|---|
| 5,305,370 A | 4/1994 | Kearns et al. | |
| 5,515,043 A | 5/1996 | Berard et al. | |
| 5,742,233 A | 4/1998 | Hoffman et al. | |
| 5,808,564 A | 9/1998 | Simms et al. | |
| 5,838,237 A | 11/1998 | Revell et al. | |
| 5,895,436 A | 4/1999 | Savoie et al. | |
| 5,898,680 A * | 4/1999 | Johnstone et al. | .......... 370/316 |
| 5,930,717 A | 7/1999 | Yost et al. | |
| 5,945,947 A | 8/1999 | Cunningham | |
| 6,032,036 A | 2/2000 | Maystre et al. | |
| 6,044,257 A | 3/2000 | Boling et al. | |

(Continued)

FOREIGN PATENT DOCUMENTS

DE 43 21 418 A1 1/1995

(Continued)

OTHER PUBLICATIONS

Int'l Search Report for Int'l Application No. PCT/US2004/024606, filed Jul. 30, 2004.

(Continued)

Primary Examiner—Daniel Wu
Assistant Examiner—George Bugg
(74) Attorney, Agent, or Firm—Tucker Ellis & West LLP

(57) ABSTRACT

The present invention is directed to a position isolation system comprising at least one portable cellular transmitter adapted for wireless data communication via an associated cellular communication system. Data exchange between the at least one cellular transmitter and an associated tracking station is initiated via the associated cellular communication system. The data exchange obtains additional position data representing an associated, cellular relay system through which the cellular data exchange is made, enabling isolation of the location of the portable cellular transmitter in a limited geographic region. The position isolation system also includes a secondary transmission system, associated with the portable transmitter, that is adapted for outputting information representing secondary location data. The secondary location data has a positioning resolution within that of the limited geographic region.

10 Claims, 4 Drawing Sheets

Device Block Diagram

U.S. PATENT DOCUMENTS

| | | |
|---|---|---|
| 6,185,410 B1 | 2/2001 | Greene |
| 6,459,704 B1 | 10/2002 | Jandrell |
| 6,509,868 B1 * | 1/2003 | Flick .................. 342/357.07 |
| 6,757,545 B1 * | 6/2004 | Nowak et al. ........... 455/456.2 |
| 2001/0048387 A1 | 12/2001 | Sheynblat |
| 2003/0063000 A1 | 4/2003 | Grimm |
| 2003/0148771 A1 * | 8/2003 | de Verteuil ................. 455/456 |
| 2003/0216144 A1 * | 11/2003 | Roese et al. ............ 455/456.1 |
| 2004/0029558 A1 | 2/2004 | Liu |

FOREIGN PATENT DOCUMENTS

| | | |
|---|---|---|
| DE | 44 21 227 A1 | 12/1995 |
| WO | WO 95/03677 | 2/1995 |
| WO | 0 812 119 A2 | 12/1997 |
| WO | WO 98/34126 | 8/1998 |
| WO | WO 01/40822 | 6/2001 |
| WO | WO 02/091325 | 11/2002 |

OTHER PUBLICATIONS

Brad Murray, et al., "Location Tracking System With Hand-off Capabilities", XP-000594601, May 1996, pp. 168-173.

* cited by examiner

Device Block Diagram

Tracking Receiver Block Diagram

SYSTEM FOR TRACKING AND LOCATING AN OBJECT USING A CELLULAR NETWORK

CROSS REFERENCE TO RELATED APPLICATIONS

The present application is related to U.S. Provisional Application 60/491,951 filed Aug. 1, 2003 and U.S. Provisional Application 60/491,952 filed Aug. 1, 2003.

BACKGROUND OF INVENTION

The present invention relates generally to tracking systems for tracking the location of valuable materials, persons, objects, and more particularly, but not limited, to the tracing of stolen articles, object or persons through existing cellular network infrastructure, global positioning system (GPS), and location algorithms using a combination of directional vectors and signal strength estimates based on Radio Frequency transmissions.

Many systems exist which make use of the constellation of Global Positioning satellites orbiting the earth. Such systems range from navigational aids to tracking devices. For example, there is a vehicle tracking and security system that allows immediate response in case of vehicle theft, an accident, vehicle breakdown, or other emergency. Guardian and tracking functions are provided through mobile units installed in hidden locations in vehicles to be monitored. The mobile units communicate with a control center. Preferably, the mobile unit provides vehicle theft and intrusion protection using an in-vehicle alarm and security system linked to the control center by a transceiver in the mobile unit. Also, a keypad or other human interface device is provided, allowing a vehicle driver or occupant to signal the control center that a particular type of assistance is needed. The vehicle's location may be automatically transmitted to the control center along with any automatic alarm signal or manually entered request, the location being precisely determinable anywhere in the world through use of Global Position System (GPS) information. The system provides continuous monitoring of a large number of vehicles for a broad range of status and emergency conditions over a virtually unlimited geographic area, also allowing manual communication of requests for assistance to that specific location.

Another example of the use of GPS to track the location of an automobile is an automatic vehicle location system that includes a radio positioning system receiver which receives GPS radio signals and includes a two-gimbaled gyroscope, which is used by a dead-reckoning positioning system. A controller determines position based upon the radio positioning system when the radio signals are available and upon dead-reckoning when the radio signals are not available. The dead-reckoning process is based upon a compensation factor, which is established in response to data received from the radio positioning system. The compensation factor acts as an adjustment to an inner gimbal angle to compensate for a minor drift away from level by the inner gimbal.

A further example might be a method for detecting the position of a moving body in which the position of a moving body such as a vehicle can be detected with a high degree of precision. It is possible to perform at least data communication using radio waves between radio base stations and a vehicle capable of movement. Precise positions are stored in advance in the radio base stations and radio wave clocks that keep a common time are provided in the radio base stations. The radio base stations transmit radio waves containing this time information. The vehicle receives these radio waves and determines the difference between the received time information a clock provided in the vehicle in order to detect the current position of the vehicle by calculating the distances between the vehicle and each of the radio base stations. Furthermore, it is also possible for the position of the mobile station to be calculated using a combination of information from the fixed station and information from GPS satellites. By employing this type of structure, it is possible to calculate the position of the mobile station even when it is not possible to calculate the position of the mobile station using the fixed stations alone or GPS satellite alone. Therefore, it is possible to find the position of the mobile station more accurately than when a conventional method is used.

There also exists a tracking device configured to resemble a stack of currency and represents a system for use in catching thieves. The device relates to the electronic tracking of cash stolen from a bank or other institution via an electronic signaling device placed within a stack of currency that transmits location information to the authorities as the cash is moved from location to location. The tracking device allows law enforcement officers to electronically monitor money stolen from a bank. The tracking device is sized to fit within a stack of currency in a teller's drawer or a bank's vault. When the tracking device is activated, it transmits a beacon signal that continuously runs for the duration of the battery. Thus, the tracking device would automatically send a signal to either a fixed monitoring station, such as a local police station, or to a mobile monitoring station, such as a helicopter or police car, allowing for continual tracking of the thief in possession of the stolen money. By knowing the location of the money, the police can track and apprehend the perpetrators. It is designed to be a circuit card smaller than a dollar bill and thin enough to be concealed between two (2) bills, thereby allowing it to be placed into a stack of money undetected. Further, the device can be waterproofed and made flexible, which will have no effect on its ability to be continually tracked, but would prevent someone from shorting out the device in liquid. Alternative embodiments allow variations of the tracking device to be placed within other objects of value. An alternative embodiment allows the tracking device to be automatically activated when it is taken past a certain point (electronic fence) from where it is stored.

Furthermore, there are tracking systems for tracking the location of stolen articles, and more particularly, to disguised currency bundles for aiding law enforcement officials in apprehending thieves and recovering stolen monies. The system includes a security pack for assisting in the recovery of stolen monies which includes a housing disguised as a bundle of currency bills, but containing a GPS receiver for receiving GPS signals from overhead satellites combined with a cellular phone transmitter (Module), a microprocessor, antennae, and a battery. Following a bank robbery, the microprocessor activates the cellular phone transmitter to dial the telephone number of a central monitoring station. The microprocessor obtains location data from the GPS receiver and transmits the location data, along with identification information, to the central monitoring station. The security pack may also include a separate, conventional RF beacon transmitter for allowing authorities to home-in on the security pack within a large building or other structure, either after the GPS signals are lost, or after the location of the security pack is localized to a specific area, building or individual.

All of the devices described above are implemented, or require for implementation, access to GPS or a custom radio network of receivers. This is an expensive requirement, increasing overall costs and the size of the devices. There is thus a need for a smaller, less expensive solution to tracking and aiding law enforcement officials in the recovery of lost or stolen articles or missing children while utilizing existing cellular telephone network infrastructure.

SUMMARY OF INVENTION

In view of the aforementioned needs, there is contemplated a system, method and device capable of being implemented using existing communications infrastructure to locate a missing, stolen, or lost item or person.

In accordance with the subject invention, there is provided a position isolation system comprising at least one portable cellular transmitter adapted for wireless data communication via an associated cellular communication system. Data exchange between the at least one cellular transmitter and an associated tracking station is initiated via the associated cellular communication system. The data exchange obtains additional position data representing an associated, cellular relay system through which the cellular data exchange is made, enabling isolation of the location of the portable cellular transmitter in a limited geographic region. The position isolation system also includes a secondary transmission system, associated with the portable transmitter, that is adapted for outputting information representing secondary location data. The secondary location data has a positioning resolution within that of the limited geographic region.

In a preferred embodiment, the secondary transmission system includes a global positioning system for generating secondary location data in accordance with satellite acquired positioning data. In another embodiment, the secondary transmission system includes means adapted for communicating a location beacon to at least one associated receiving station, in order to facilitate the generation of the secondary location data. In another embodiment, the position isolation system also includes means adapted for securing the portable cellular transmitter and the secondary transmission system, concealed, within an associated item of value. The system further includes triggering means adapted for triggering the activation means in accordance with a selected trigger event.

Further, in accordance with the subject invention, there is provided a system for locating objects. The system includes at least one portable cellular transmitter capable of wireless data communication using an associated cellular communication system. The system also includes a device controller, which includes means for acquiring cellular location data representing at least one telecommunication cell associated with a transmission from the transmitter. The device controller also includes a database, inclusive of map information relating to the cellular location data. The device controller further includes an interface adapted for outputting location data including a selected portion of the map information corresponding to the cellular location data. The system includes activation means for selectively initiating data exchange between the cellular transmitter and the device controller via the associated cellular communication system. The system further includes means adapted for initiating a secondary location operation in connection with the selected portion of the map information.

In a preferred embodiment, the system for locating objects uses means adapted for activating a global positioning system to generate secondary location data in accordance with satellite acquired positioning data. Means adapted for communicating the secondary location data are then used to transmit the secondary location data to at least one associated receiving system. In another embodiment, the system for locating objects uses means adapted for communicating a location beacon to at least one associated receiving station.

The subject invention is directed to a tracking system that is capable of locating and recovering a person or valued article. The system comprises a tracking device (hereinafter "Device" or "Unit"), the existing cellular-telephone network infrastructure (hereinafter, "Air-link"), tracking, database, analysis and display software (hereinafter, "Device Controller"), and vehicle-mobile (hereinafter "Trackers") direction-finding transceivers and man-portable (hereinafter "Hand-Held Trackers") direction-finding receivers.

In accordance with the subject invention, the Device comprises a wireless cellular-data modem, a beacon transmitter, supervisory control logic means, antennae, a portable power-supply, a user interface, and an application specific enclosure.

In one aspect of the subject invention, the Device Controller comprises a computer readable medium of instruction for receiving status data from a fielded Device, sending command data to the fielded Device, providing database registration/deregistration for the Device entering or leaving service, providing event logging for the Device in service, providing a graphical tactical display that locates all active Devices and Trackers and Hand-Held Trackers. The Device Controller suitably shares the tracking data it has collected from all Trackers and Hand-Held Trackers, thereby providing each fielded Tracker and Hand-Held Tracker with full access to view the tactical display of a developing track. Furthermore, the Device Controller is capable of acting as a central repository for tracking event data, as well as for system administrative functions.

In another aspect of the subject invention, there is a Tracker comprising a vehicle-portable direction-finding ("DF") receiver capable of homing in on a beacon signal generated by a Device. The Tracker is equipped so that it is network aware, as well as position aware. The Tracker shall be capable of relaying its own position and the absolute bearing angle and/or proximity to the beacon transmitter, i.e., the Device, back to the Device Controller using the Air-link. The Tracker is further equipped with means to receive, from the Device Controller, tracking data the Device Controller receives from other Trackers and Hand-Held Trackers, wherein the user of the Tracker is provided with access to the full tactical view of a developing track. In essence, the Tracker is capable of working in concert with other fielded Trackers and Hand-Held Trackers, thereby coordinating activities in a "wolf-pack" fashion. In an alternate embodiment, the Tracker may also be equipped with a global positioning system to provide fine-position resolution.

In one aspect of the subject invention, there is a Hand-Held Tracker, i.e., a hand-held tracking receiver, to be utilized in environments that do not permit vehicle access; i.e., within buildings, shopping centers, etc. These devices shall also be network- and position-aware; then shall optionally include fine-position resolution capability using the global positioning system (GPS). Each tracking receiver shall be capable of relaying its own position and the absolute bearing angle and/or proximity to the beacon transmitter back to the Device Controller via the Air-link. The Hand-Held Tracker is further equipped with a display and user interface, a cellular modem, a microcontroller, and a direction finding receiver. In an alternate embodiment of the Hand-Held Tracker, there is provided a heading sensor compass and a GPS receiver.

In another aspect of the subject invention, there is a method for using the existing cellular-telephone network infrastructure to supply geographic location data of a cellular site that is currently servicing the Device.

Still other aspects of the present invention will become readily apparent to those skilled in this art from the following description wherein there is shown and described a preferred embodiment of this invention, simply by way of illustration of one of the best modes suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF DRAWINGS

The accompanying drawings incorporated in and forming a part of the specification, illustrates several aspects of the present invention, and together with the description serve to explain the principles of the invention. In the drawings.

DETAILED DESCRIPTION

Throughout this description, the preferred embodiment and examples shown should be considered as exemplars, rather than limitations, of the present invention.

Figure 1:
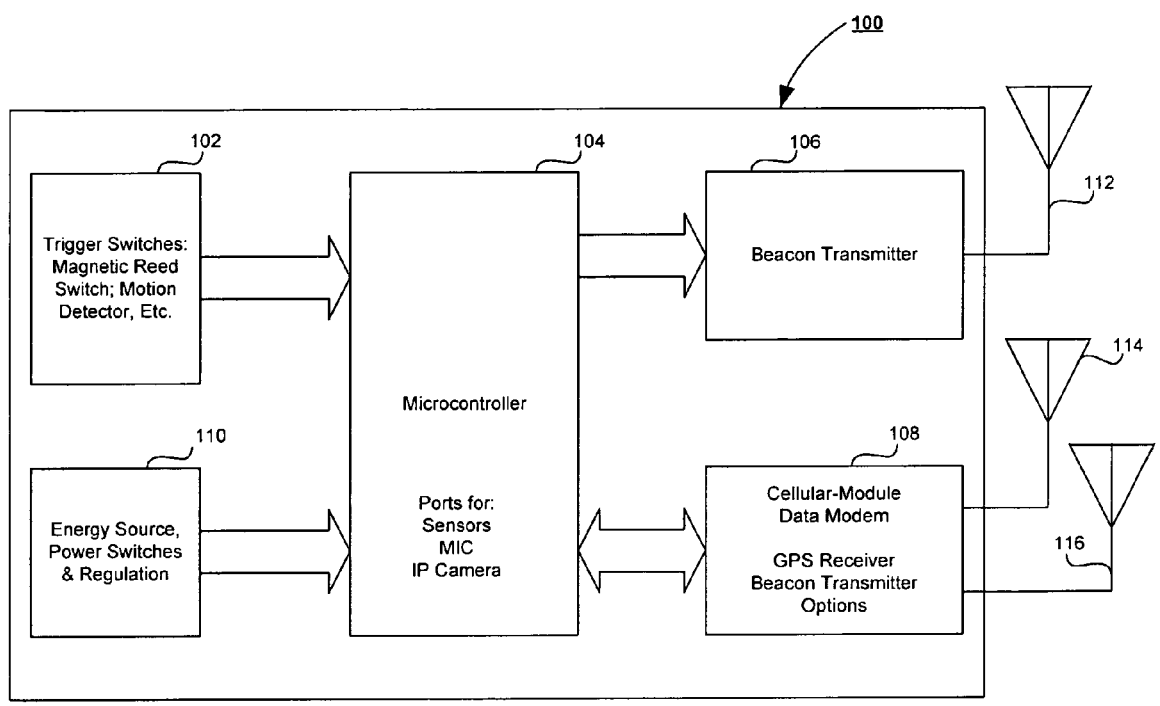
FIG. 1 is an example of a block diagram of a Device.

Referring first to FIG. 1 there is illustrated a block diagram of Device 100. The Device 100 comprises a trigger switch 102 operatively coupled to a microcontroller 104. It will be appreciated by one of skill in the art that the trigger switch is suitably constituted by a plurality of different mechanisms and electromechanical means. For example, the trigger switch 102 is advantageously a reed switch, a motion detector, a clock, and a counter, internally or externally activated. An energy source 110 is suitably constituted by internal or external means, e.g., rechargeable batteries, alkaline batteries, photovoltaic cells, fuel cells, lithium-ion, nickel-cadmium, or nickel-metal hydride, and provides electric power to the various other components of the Device 100.

The Device 100 further incorporates a beacon transmitter 106, and a cellular data modem 108, which is capable of including a global positioning system transceiver. The beacon transmitter and its attached antenna 112, is communicatively coupled to the microcontroller 104 and receives power from the energy source 110. Similarly, the cellular data modem/global positioning system transceiver 108, and its respective antennae 114 and 116, also are communicatively coupled to the microcontroller 104 and draw power from the energy source 110. One of appreciable skill in the art will take notice that the type of power source is dependent upon the application for which the Device 100 is being utilized. Thus, the capacity of the energy source 110 is of a size determined by compatibility with the Device's 100 specific application, deployment environment, and operational endurance requirements. For example, in the case of application to persons, the endurance of the Device 100 will be noticeably longer than the application of the Device 100 to a valuable article, e.g., a ream of bank notes.

The microcontroller 104 implements supervisory logic control over the Device 100. The microcontroller 104 is responsible for controlling and operating the beacon transmitter 106, controlling the cellular data modem 108, receiving input from the trigger switch 102 and regulating the energy source 110. The microcontroller-logic section, exemplified in FIG. 1 as the microcontroller 104, is responsible for coordinating communications over the Air-link, monitoring the Device's 100 user-interface (if any), and managing resources used by the Device 100. Firmware residing on the microcontroller 104 provides for transfer of small data payloads to and from the Device 100. One of ordinary skill in the art will appreciate that such a transfer is suitably implemented using standard text-messaging protocols currently in widespread use. The firmware residing on the microcontroller 104 is equipped to accept operating-mode commands including adjustment parameters. This allows the operations of the Device 100 to be dynamically and finely tailored to a given tracking situation by making transmission rates, cell-modem 108 reporting intervals, message recipients, etc., remotely adjustable. It will also be understood by those skilled in the art that the microcontroller 104 suitably comprises ports (not shown) for a variety of sensors, microphones, IP cameras, and the like. The addition of various ports to the microcontroller 104 enables a broader range of data to be collected by the Device 100.

The cellular-data modem 108 is advantageously a purchased modular sub-assembly, or for volume applications may be based upon a fully integrated chip-level design. Operatively coupled to the cellular modem 108 is the cellular modem antenna 114. It will be appreciated that antenna 114 and 116 are capable of being mounted either internally or externally, dependent upon the application for which the Device 100 is correspondingly implemented. That is, the antenna 114 is able to be visible externally, for instance in the case of a child's shoe, belt-buckle or the like, or operatively integrated with the enclosure of the Device 100, for use with bank notes, works of art, or other valuable articles. As one of skill in the art will notice, protocols used by the cellular modem 108 will depend upon the application of the Device 100, the location of the device, and the actual modem implemented. Protocols used by the cellular-data modem 108 include, but are not be limited to TDMA, CDMA, GSM, IP, TCIP, or the like. The choice of cellular-telephone protocol will be dictated by the Device's 100 specific application and deployment environment.

The beacon transmitter 106 is any radio-frequency (RF) transmitter known in the art or becoming available in the art. For purposes of example only, a suitable variable frequency transmitter of 160 MHz to 460 MHz is used. An example of such a transmitter is the ETS product manufactured and distributed by Spectrum Management, LLC. One system employs a proprietary array of antennas distributed around an area of interest. This array allows for coarse tracking of a transmitter disposed within an area covered by the proprietary array. Information obtained from this coarse tracking allowed for positioning of secondary tracking devices so as to more precisely track a location of the transmitter. Such system, while fully functional, requires the added expense of installing and maintaining the proprietary transceiver network. As such, certain areas, such as rural locations, would often lack the necessary commercial activity or infrastructure to allow for operation.

The beacon transmitter 106 envisioned in the preferred model of the Device 100 is an amplitude-shift-keyed (ASK) very-high-frequency (VHF) RF transmitter circuit that outputs 100 mW of RF energy into a 50 Ohms load. The beacon transmitter 106 is controlled and operated by supervisory logic control means implemented in the microcontroller 104. The beacon transmitter 106 is operatively and communicatively coupled to the beacon transmitter antenna 112. In one embodiment, the antenna 112 is integrated into the Device 100 enclosure. The skilled artisan will appreciate that the antenna 112 is capable of being externally mounted, depending upon the application for which the Device 100 is currently being implemented. It will be noted that each beacon transmitter 106 used in implementing the subject invention uses a unique identification code. Such code is suitably differentiated by software integral to the beacon transmitter 106 or by code residing in the microcontroller 104.

The Device 100 is capable of implementation in a variety of forms, depending upon the application for which the Device 100 is utilized. For example, and not intending to limit the protection for which the subject invention is legally and equitable entitled, there are planar embodiments, formed cavity embodiments, modular or integrated embodiments, embodiments utilizing camouflaged means, etc. An example would be a flat, planar embodiment capable of insertion without noticeable deformation, into a stack of bank notes. There is also insertion into the sole of a shoe or belt enabling location of a missing person. Further enclosure embodiments are advantageously customized to represent the desired object for affixation of the Device 100.

Figure 2:
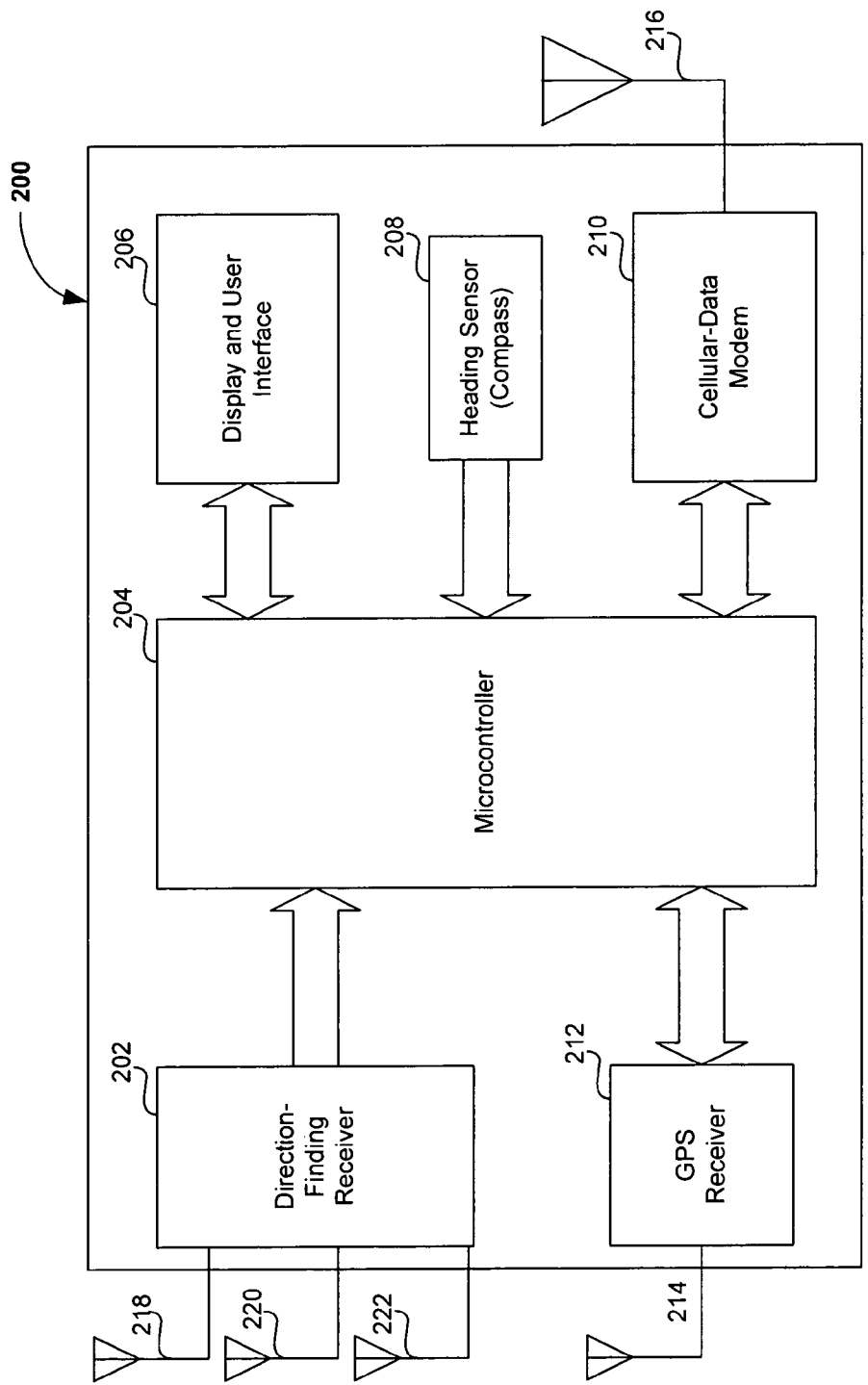
FIG. 2 is an example of a block diagram of a Tracking Receiver.

Turning now to FIG. 2 there is provided a block diagram exemplifying the subject invention's tracking receiver 200 receiving components, or the internal components of the Tracker and Hand-Held Tracker. As will be appreciated by one of skill in the art, the enclosures for the Tracker and the Hand-Held Tracker are capable of taking any number of formats, from a laptop computer, a Personal Data Assistant (PDA), a cellular telephone, a desktop computer, or the like. Of importance, as observable to the skilled artisan, is the inclusion of the components outlined in FIG. 2. For purposes of explanation of FIG. 2, the term "tracking receiver 200" is used to reference the Tracker and the Hand-Held Tracker.

The tracking receiver 200 of FIG. 2, includes a microcontroller 204 suitably adapted to control a variety of integrated components and external devices. It will be appreciated by those skilled in the art that microcontroller 204 is suitably implemented by the microprocessor of a typical laptop, desktop or PDA. Operatively coupled to the microcontroller 204 of the tracking receiver 200 is a direction-finding (DF) receiver 202, with three attached antennae 218, 220 and 222. As contemplated by the present invention, the three antennae 218, 220 and 222 apportioned to the DF receiver 202, as will be apparent to one skilled in the art, enables the DF receiver 202 to triangulate the signal broadcast by the beacon transmitter 106 of the Device 100. The DF receiver 202 is communicatively coupled to the microcontroller 204. The microcontroller 204 then implements supervisory logic means stored thereon to facilitate the translation of inputs received via the DF receiver 202 onto an integrated user interface and display 206. The microcontroller 204 advantageously varies from a microprocessor residing on a laptop computer, PDA or other mobile computing device.

The microcontroller 204 is operatively coupled to an optional GPS receiver 212 and an optional heading sensor/compass 208. The optional equipment provides greater range and mobility to the tracking receiver 200 than the DF receiver 202 alone. The tracking receiver 200 further includes a cellular data modem 210 and a cellular modem antenna 216 in operative connection with the microcontroller 204. The GPS receiver 212 and the heading sensor (compass) 208 are optionally depicted in FIG. 2 and do not form part of the preferred embodiment.

The display and user interface 206 are any display and/or user interface known in the art, ranging from an LCD, TFT, or other visual means for displaying the output from the microcontroller 204 enabling an operator to view a location of the Device 100. A standard QWERTY keyboard, touchpad, directional pad, stylus or other input means are used to implement the user interface as depicted as the display and user interface 206 of FIG. 2. The cellular-data modem 210 of the tracking receiver of FIG. 2 receives information from the Device Controller via the existing cellular telephone network infrastructure. Operatively coupled to the modem 210 is a cellular antenna 216, which is alternatively integrated into the tracking receiver enclosure or extending externally therefrom. Communications between the Device Controller and the tracking receiver are transmitted from the modem 210 to the microcontroller 204. Such communication allows the tracking receiver to function remotely from the Device Controller and allows the operator to participate in the tracking of the Device 100.

In an alternate embodiment, the GPS receiver 212, the GPS antenna 214 and the heading sensor (compass) 208 are also depicted in FIG. 2. The inclusion of these two components into the tracking receiver allows the Device Controller to monitor and plot the location of all tracking receivers currently being fielded in the search for Device 100. The implementation of the GPS receiver 212 need not be integral to the tracking receiver. GPS modules are capable of subsequent attachment via any means known to one of ordinary skill in the art.

Furthermore, depending upon the configuration of the tracking receiver, the power supply (not shown) for the tracking receiver will vary. Such power sources include, but need not be limited to, photovoltaic cells, rechargeable batteries, alkaline batteries, generator means, or, in the case of the vehicle mounted embodiment, directly to the 12-volt system operating the internal combustion engine of the vehicle.

Figure 3:
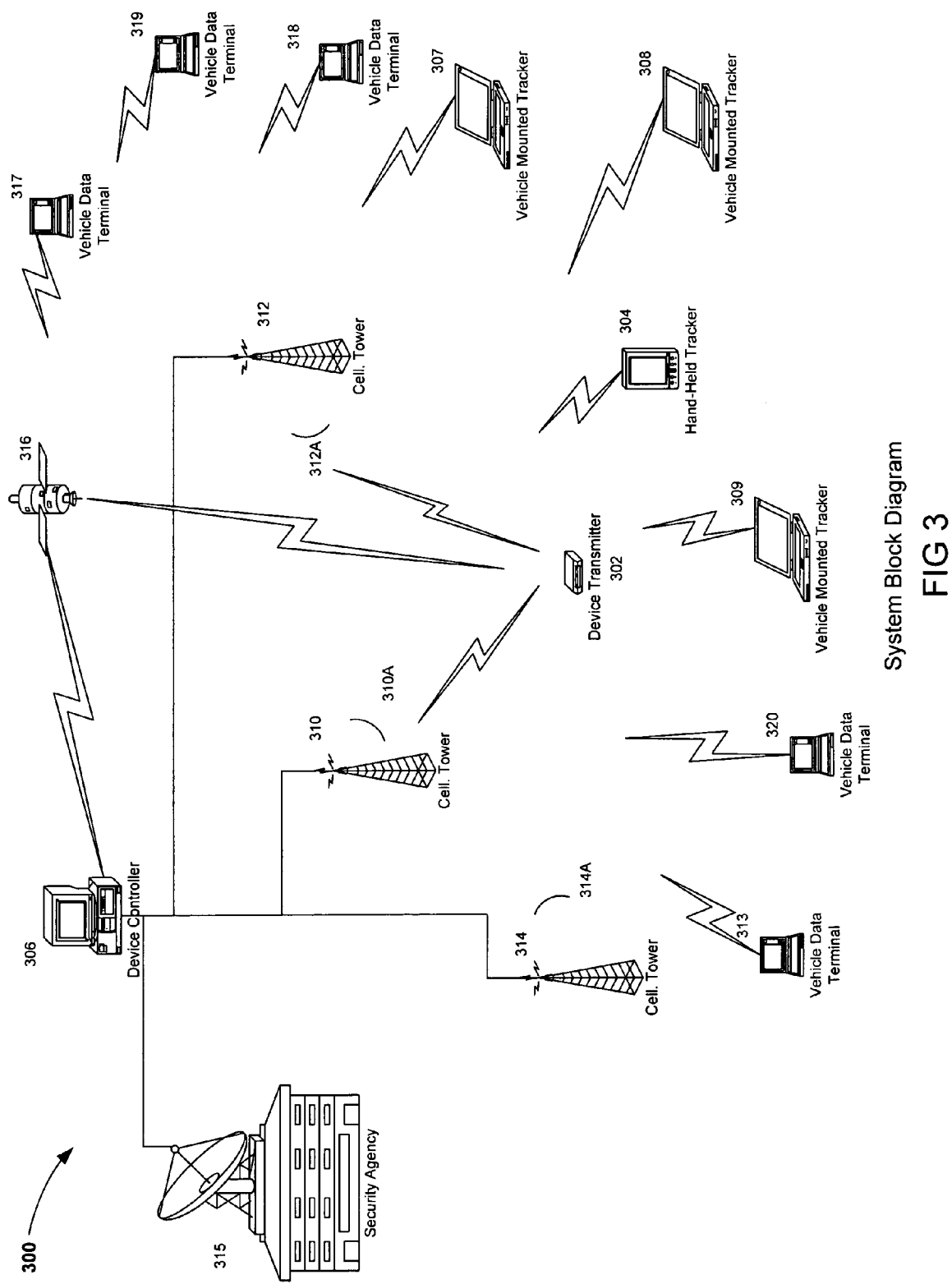
FIG. 3 is an example of a system implementing the subject invention.

As used in FIG. 3, the Device 100 is implemented, in the form of the planar embodiment, for use with tracking a stack of bank notes stolen during a robbery, and for purposes of explanation, the planar embodiment is represented as Device Transmitter 302. It should be appreciated that the following example is easily relatable to another valuable article equipped with the Device 100 or even a missing child on which the Device 100 has been affixed onto an article of clothing. It should also be understood by those skilled in the art that the use of a single Device 100 is for exemplification only. The subject invention is equally capable of employing multiple Devices for use in a single stack of currency, layered between or attached to different bills in the stack. The skilled artisan will appreciate that multiple Devices in the stack of currency suitably enables continual tracking should one or more Devices loose power, be discovered, or be destroyed.

Returning to FIG. 3, there is shown a Device Controller 306 communicatively coupled to cellular towers 310, 312, and 314, as well as in communication with the Security Agency 315. The Device Controller 306, as explained above, operates to coordinate efforts of tracking the Device Transmitter 302 as it is moved from location to location. As the stack of bank notes (not shown) in which a Device Transmitter 302 is hidden, are removed from the bank drawer in which they had previously been stored, the magnet (not shown) which had kept the trigger 102, e.g. inverse reed switch, opened is removed, thereby allowing the circuit to close. This then activates the microcontroller 104 by supplying power from the energy source 110. The microcontroller 104 uses the cellular modem 108 to connect to the existing cellular telephone infrastructure, represented by towers 310, 312, and 314. Concurrently with this activation of the cellular modem 108, the microcontroller 104 also instructs the beacon transmitter 106 to begin RF broadcast.

As the bank notes in which the Device Transmitter 302 is hidden, are brought into the coverage area of the cell tower 310, a specific 60 degree Sector 310A of the 360 degree coverage area around the Cell Site is identified for direction purposes when the broadcast signal is picked up and the Device Controller 306 receives the signal. The Device Controller 306 processes the signal, noting that the cell tower 310 is the originating tower. The Device Controller 306 then determines the location of the cell tower 310 and the 60 degree Sector 310A direction (the Sector indicated direction) and plots its location on a tactical map for uploading to the Trackers 307, 308, 309 and the Hand-Held Tracker 304 (HHT). The Trackers 307, 308, 309 and the HHT 304 are then directed by the Device Controller 306 to the specific Sector 310A coverage area of the cell tower 310. The 360 degree coverage area around any given cellular tower is divided into six (6) 60 degree Sectors, represented in FIG. 3 as 310A, 312A, 314A, the size of the coverage area varies, but a typical coverage area ranges from a diameter of one mile to upwards of ten miles. It will be appreciated by one skilled in the art that the subject invention need not be limited to 60 degree Sectors. For example, the subject invention is equally capable of implementing three (3) 120 degree Sectors, or various other arcs of coverage, as dictated by the circumstances surrounding implementation of the subject invention.

While shown as a PDA, it will be appreciated that the HHT 304 is capable of implementation as any other portable communications device known in the art, provided the components, as presented herein, are included. Furthermore, the Device Controller 306 is depicted as a stationary personal computer, however one of ordinary skill in the art will appreciate that another computer processing device is capable of being advantageously employed in the subject invention.

The Device Controller 306 is a software application that runs on a standard PC, or alternatively is run as a process on a multi-tasking server-computer at the Security Agency (not shown) location. The Device Controller's 306 function is similar to that of Area-Wide-Monitor (AWM) software, which in essence provides for coarse tracking through a proprietary array of antennae distributed around an area of interest. The AWM monitors these antennae using customized software to obtain information allowing for the positioning of secondary tracking devices. The Device Controller 306 receives status data from the fielded trackers 304, 307, 308 and 309, provides database registration/deregistration for the Device 100 entering or leaving the service area, provides event logging for all Devices in service, and provides a graphical representation of locations of both Devices and active tracking receivers.

As the Trackers 307, 308, 309 and the HHT 304 are vectored in to the general vicinity of Device Transmitter 302, the bank notes in which the Device Transmitter 302 is hidden enter the coverage area of cellular tower 312. Typical procedure for cellular architecture is to allow the cell tower 312 to pick up transmission and the cell tower 310 to drop transmission. The present invention, however, uses the relative known locations of cell towers 310 and 312, allowing the Device Controller 306 to narrow the location of the Device Transmitter 302 to a much smaller area. The art of triangulation is well known in the art and need not be re-presented for purposes of this example. The narrowed location is then transmitted from the Device Controller 306 to the Trackers 307, 308, 309 and the HHT 304 via the cellular modems 210. At this point in the tracking process all vehicles in the law enforcement fleet equipped with vehicle data terminals 313, 317, 318, 319 and 320 become part of the tracking process.

Having thus been directed towards the Device Transmitter 302, the Trackers 307, 308, 309 and the HHT 304 are now in range of the beacon transmitter 106. As the four trackers 304, 307, 308, 309 approach the Device Transmitter 302, the DF receivers 202 (located on each tracker) triangulate the signal being broadcast by the Device Transmitter 302, i.e., the Device 100, located in the stolen bank notes. The microcontrollers 204 of the trackers 304, 307, 308, 309 process the triangulated signals received by the DF receivers 202 and present the operators with graphical information via the display and user interfaces 206. Updated information received via the cellular towers 310 and 312 is continually transmitted to the Device Controller 306, as well as updated information from the trackers 304, 307, 308, 309. This allows the Device Controller 306 to monitor and direct the trackers 304, 307, 308, 309 ever closer to the Device Transmitter 302.

In an alternate embodiment, using the above example and FIG. 3, there is shown one satellite representative of the constellation of global positioning satellites 316. In this embodiment, the trackers 304, 307, 308, 309 are equipped with GPS receivers 212. This embodiment enables a service provider to use the trackers 304, 307, 308, 309 to track the Device 100, and then notify authorities to move in. Such positioning would be extremely helpful in the hands of Federal Bureau of Investigation agents pursuing a kidnapper. The agents in the field could give definitive positions, in the form of longitude and latitude coordinates to other agents, closing in on the kidnapped victim.

It should be noticed that the ability to transmit position data from a tracker to the Device Controller 306 using existing cellular infrastructure has a myriad of potential applications. The Device Controller 306 is able to record and report last known positions of the Device 100, the Trackers 307, 308, 309 and the HHT 304. Such reports are used by law enforcement or search and rescue authorities for both the apprehension of criminals and for the rescue of stranded hikers. The use of the existing cellular infrastructure further allows the Device Controller 306 to transfer small data payloads to and from the Device Transmitter 302, implemented by using standard text-messaging protocols still in use. For example, a child's shoe equipped with the device notifies the child or responsible adult of an emergency. The most appropriate format would be latitude and longitude coordinates of the site and should include a mean radius of the cell site's Sector coverage area. Data transfer protocols should be standardized across all network providers. The data interface between the existing cellular telephone network and the Device Controller 306 could take several forms, including, but not limited to, Internet connectivity via an Internet Service Provider, dial-in access, or direct access via a cellular modem at the display console.

Figure 4:
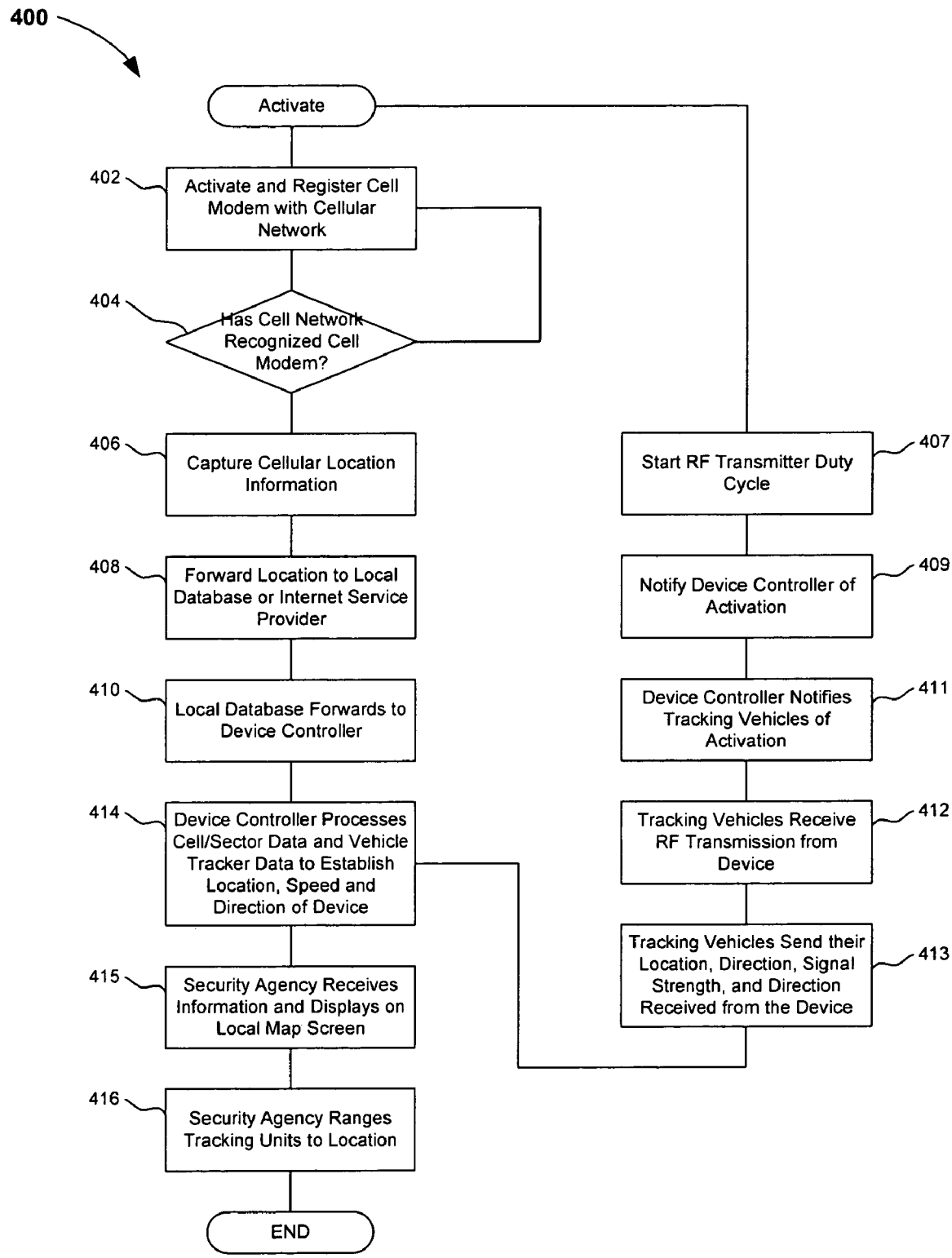
FIG. 4 is an illustration of a flow chart of a method in accordance with one aspect of the present invention.

Referring now to FIG. 4, there is shown a flow chart depicting the operation of the system of the subject invention. The operation of the system requires a number of operations to be performed to allow the location of the Device 100 to be used by the Trackers 304, 307, 308, 309. Beginning at step 402, the cellular modem 108 of the Device 100 is activated and registered with the cellular network. It will be understood, with respect to the subject invention discussed above, that the triggering event, i.e., the event causing the activation, is any movement or other means of activating the Device 100. The method progresses to step 404 where a determination is made whether the cellular network has failed to recognize the cellular modem. If the cellular modem is not recognized by the cellular network, the method then returns to step 402 and the cellular modem again attempts to register with the existing cellular network. If the Device 100 has successfully registered with the cellular network at step 404, the method proceeds to capture the cellular location information from the Device 100 at step 406.

After capture of the location information, the system will proceed to step 408, where the location information is transmitted to the service provider at the Local Database or Internet Service Provider in step 408. The Local Database, depending upon the type of services being provided, or alternatively, the Internet Service Provider, forwards the information along to the Device Controller 306 in step 410, or provides the location of the Device 100 to the owner as part of the services provided thereto. In the event that the information is passed on to the Device Controller 306 in accordance with step 410, the Device Controller 306 at step 414 receives the information and processes the cellular/Sector data and the corresponding vehicle tracker data to establish the speed and direction of the Device 100.

At step 415, the Security Agency 315 receives the information and displays the location on a local map screen. It will be understood by those skilled in the art that the Security Agency 315 is any governmental or security organization capable of locating and/or apprehending the Device 100. It will be further appreciated by one of ordinary skill in the art that any other suitable display will be satisfactory to accomplish the forgoing.

The Security Agency is then able to forward the tracking information to its police units in the field at step 416. This equates to the Security Agency, using the information garnered from the existing cellular network, to vector its units towards the Device 100. Once in the general area, as directed by the Security Agency in step 416, the fielded units use a vehicle mounted tracker or a Hand-Held Tracker to close in on the Device 100.

Alternatively, as shown in FIG. 4, when the cellular network is not available, the Device 100 activates a Radio-Frequency (RF) transmitter at step 407. At step 409, the Device Controller 306 receives the RF transmission and becomes aware of the activation. The Device Controller 306 then notifies tracking vehicles of the activation at step 411. Beginning at step 412, the tracking vehicles receive the RF transmission from the Device 100. The tracking vehicles then send their corresponding location, direction, signal strength and direction from which the RF transmission is being received to the Device Controller 306 at step 413. The system then returns to step 414, where the Device Controller 306 processes the incoming information in order to accurately determine the location, speed and direction of the Device 100. The system continues to operate as set forth above.

The embodiments above allow for a non-governmental entity, in the form of a service provider, to provide security for a customer. That is, the service provider is able to provide a customer with the whereabouts of the customer's tagged objects at any time. In the event the tagged object has been purloined, the service provider is even able to direct the police to the location of the missing object, using nothing more than the existing cellular telephone network infrastructure.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. A position isolation system comprising:
   at least one portable cellular transmitter adapted for wireless data communication via an associated cellular communication system;
   activation means for selectively initiating data exchange between the at least one cellular transmitter and an associated tracking station via the associated cellular communication system, wherein data of the data exchange obtains additional position data representative of an associated, cellular relay system through which the cellular data exchange is made so as to allow for isolation of a location of the at least one portable cellular transmitter in a limited geographic region; and
   a secondary transmission system associated with the at least one portable cellular transmitter, wherein the secondary transmission system is adapted for outputting information representative of secondary location data having a positioning resolution within that of the limited geographic region, and the secondary transmission system is adapted for generating a location beacon, wherein the secondary location data is generated as a function of a strength of the location beacon.

2. The position isolation system of claim 1, wherein the secondary transmission system includes a global positioning system for generating secondary location data in accordance with satellite acquired positioning data.

3. The position isolation system of claim 1, wherein the secondary transmission system includes means adapted for communicating a location beacon to at least one associated receiving station so as to facilitate generation of the secondary location data.

4. The position isolation system of claim 3, wherein the secondary location data is generated mathematically in accordance with receipt of the location beacon by a plurality of associated receiving stations.

5. The position isolation system of claim 1, further comprising:
   means adapted for securing the at least one portable cellular transmitter and the secondary transmission system so as to be generally concealed within an associated item of value; and
   triggering means adapted for triggering the activation means in accordance with a selected trigger event.

6. The position isolation system of claim 5, wherein the associated, valuable object includes a currency bundle, and wherein the triggering means includes a reed switch, wherein the reed switch is enabled when the currency bundle is removed from a fixed location.

7. A system for locating objects, comprising:
   at least one portable cellular transmitter adapted for wireless data communication via an associated cellular communication system;
   a device controller, the device controller includes,
      means for acquiring cellular location data representative of at least one telecommunication cell associated with a transmission from the at least one cellular transmitter,
      a database, inclusive of map information relating to the cellular location data, and
      an interface adapted for outputting location data inclusive of a selected portion of the map information corresponding to the cellular location data;
   activation means adapted for selectively initiating data exchange between the at least one cellular transmitter and the device controller via the associated cellular communication system; and
   means adapted for initiating a secondary location operation in connection with the selected portion of the map information; and
   the means adapted for initiating a secondary location operation further including mean adapted for generating a location beacon adapted for location as a function of a strength thereof.

8. The system for locating objects of claim 7, wherein the means for initiating a secondary location operation includes means adapted for activating a global positioning system for generating secondary location data in accordance with satellite acquired positioning data; and further comprising means adapted for communicating the secondary location data to at least one associated receiving system.

9. The system for locating objects of claim 7, wherein the means for initiating a secondary location operation includes means adapted for communicating a location beacon to at least one associated receiving station.

10. The system for locating objects of claim 9, wherein the means for initiating a secondary location operation includes means adapted for communicating a location beacon to a plurality of spaced-apart receivers from which secondary location information is generated mathematically.

* * * * *